US008130638B2

(12) United States Patent
Yang et al.

(10) Patent No.: US 8,130,638 B2
(45) Date of Patent: Mar. 6, 2012

(54) METHOD AND APPARATUS TO ELECT ABRS DYNAMICALLY AND INTELLIGENTLY

(75) Inventors: Yi Yang, Morrisville, NC (US); Alvaro E. Retana, Raleigh, NC (US); Abhay Roy, Santa Clara, CA (US); Alfred C. Lindem, III, Cary, NC (US); Sina Mirtorabi, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 702 days.

(21) Appl. No.: 11/339,791

(22) Filed: Jan. 24, 2006

(65) Prior Publication Data
US 2007/0171845 A1 Jul. 26, 2007

(51) Int. Cl.
*H04L 12/26* (2006.01)
(52) U.S. Cl. .......................... 370/219; 370/401
(58) Field of Classification Search .................. None
See application file for complete search history.

(56) References Cited

U.S. PATENT DOCUMENTS

| | | | | |
|---|---|---|---|---|
| 6,167,025 A * | 12/2000 | Hsing et al. | | 370/216 |
| 6,262,984 B1 * | 7/2001 | Rochberger | | 370/395.2 |
| 6,385,201 B1 * | 5/2002 | Iwata | | 370/400 |
| 6,473,408 B1 * | 10/2002 | Rochberger et al. | | 370/255 |
| 6,483,833 B1 * | 11/2002 | Jagannath et al. | | 370/392 |
| 6,484,204 B1 * | 11/2002 | Rabinovich | | 709/226 |
| 7,006,506 B1 * | 2/2006 | Naik | | 370/397 |
| 7,042,988 B2 * | 5/2006 | Juitt et al. | | 370/329 |
| 7,069,336 B2 * | 6/2006 | Mangan | | 370/401 |
| 7,082,473 B2 * | 7/2006 | Breitbart et al. | | 370/392 |
| 7,171,476 B2 * | 1/2007 | Maeda et al. | | 709/227 |
| 7,328,240 B2 * | 2/2008 | El-Gebaly et al. | | 370/401 |
| 7,334,045 B1 * | 2/2008 | Jacobson et al. | | 709/238 |
| 7,586,841 B2 * | 9/2009 | Vasseur | | 370/218 |
| 7,599,349 B2 | 10/2009 | Vasseur et al. | | |
| 7,664,043 B1 * | 2/2010 | D'Souza et al. | | 370/242 |
| 7,899,005 B2 | 3/2011 | Retana et al. | | |
| 2002/0181447 A1 * | 12/2002 | Hashizume et al. | | 370/352 |
| 2003/0142682 A1 * | 7/2003 | Bressoud et al. | | 370/401 |
| 2003/0149787 A1 * | 8/2003 | Mangan | | 709/238 |
| 2004/0003111 A1 * | 1/2004 | Maeda et al. | | 709/237 |
| 2004/0037309 A1 * | 2/2004 | Hauck et al. | | 370/462 |
| 2004/0081152 A1 * | 4/2004 | Thubert et al. | | 370/400 |

(Continued)

OTHER PUBLICATIONS

Moy, J., "OSPF Version 2," RFC: 2328, Apr. 1998, pp. 1-244.

*Primary Examiner* — Chirag Shah
*Assistant Examiner* — Joshua Smith
(74) *Attorney, Agent, or Firm* — Cesari and McKenna, LLP

(57) ABSTRACT

The present invention elects an area border router from a plurality of potential area border routers by determining a full set of all areas attached to a router. A determination is made as to a full set of area pairs from the determined full set of areas. Routers are identified in a first area of the determined full set of areas that are reachable through an intra-area route in the first area, and routers are identified in a second area of the determined full set of areas that are reachable through an intra-area route in the second area. If there is a router that is unreachable through either an intra-area route in the first area or an intra-area route in the second area, then declare the first router to be an area border router, else new first and second areas are selected.

19 Claims, 3 Drawing Sheets

U.S. PATENT DOCUMENTS

| | | | |
|---|---|---|---|
| 2004/0233882 A1* | 11/2004 | Park et al. | 370/338 |
| 2005/0041676 A1* | 2/2005 | Weinstein et al. | 370/401 |
| 2005/0249113 A1* | 11/2005 | Kobayashi et al. | 370/219 |
| 2005/0259669 A1* | 11/2005 | Ozu | 370/401 |
| 2005/0265230 A1* | 12/2005 | Na et al. | 370/219 |
| 2006/0077922 A1* | 4/2006 | Geilfus et al. | 370/317 |
| 2006/0092898 A1* | 5/2006 | Kim et al. | 370/338 |
| 2006/0198298 A1* | 9/2006 | Bhogavilli et al. | 370/401 |
| 2006/0268739 A1* | 11/2006 | Garcia et al. | 370/254 |
| 2007/0008949 A1* | 1/2007 | Balandin | 370/351 |
| 2007/0153707 A1* | 7/2007 | Thubert et al. | 370/408 |
| 2007/0165515 A1* | 7/2007 | Vasseur | 370/216 |

* cited by examiner

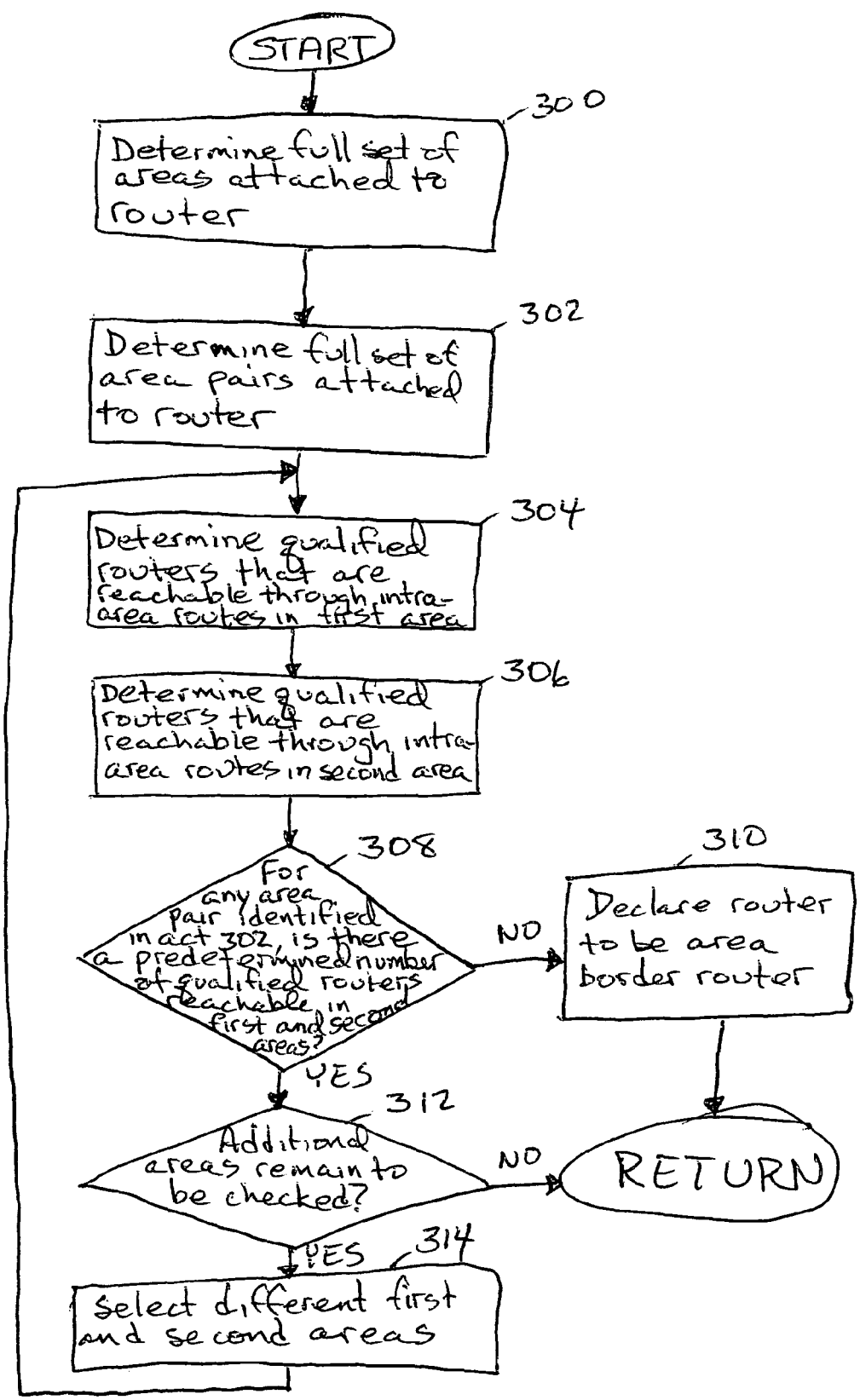

METHOD AND APPARATUS TO ELECT ABRS DYNAMICALLY AND INTELLIGENTLY

FIELD

The present invention relates broadly to packet-switched communication networks. Specifically, the present invention relates to routers in packet-switched networks that communicate with each other to determine an area border router from a group of potential area border routers.

BACKGROUND

Open Shortest Path First (OSPF) is a routing protocol developed for Internet Protocol (IP) networks. OSPF is a link-state routing protocol that calls for the sending of link-state advertisements (LSAs) to all other routers within the same hierarchical area. Information on attached interfaces, metrics used, and other variables, is included in OSPF LSAs. As OSPF routers accumulate link-state information, they use algorithms that calculate the shortest path to various routers (network nodes). The largest entity within the hierarchy is an autonomous system (AS), which is a collection of networks under a common administration that share a common routing strategy. OSPF is an intra-AS (interior gateway) routing protocol, although it is capable of receiving routes from and sending routes to other ASs. An AS can be divided into a number of areas, which are groups of contiguous networks and attached hosts. Routers with multiple interfaces can participate in multiple areas. These routers, which are called Area Border Routers (ABRs), maintain separate topological databases for each area. A topological database is essentially an overall picture of networks in relationship to routers. The topological database contains the collection of LSAs received from all routers in the same area. Because routers within the same area share the same information, they have identical topological databases.

The Shortest Path First (SPF) routing algorithm is the basis for OSPF operations. When a router using the SPF algorithm is powered up, it initializes its routing-protocol data structures and then waits for indications from lower-layer protocols that its interfaces are functional. After a router is assured that its interfaces are functioning, it uses the OSPF Hello protocol to acquire neighbors, which are routers with interfaces to a common network. The router sends hello packets to its neighbors and receives their hello packets. In addition to helping acquire neighbors, hello packets also act as "kee-palives," messages that let routers know that other routers are still functional. On multi-access networks (networks supporting more than two routers), the Hello protocol elects a designated router and a backup designated router. Among other things, the designated router is responsible for generating LSAs for the entire multi-access network. Designated routers allow a reduction in network traffic and in the size of the topological database.

When the topological databases of two neighboring routers are synchronized, the routers are said to be adjacent. Adjacencies control the distribution of routing-protocol packets, which are sent and received only on adjacencies. Each router periodically sends its LSAs to provide information on a router's adjacencies or to inform others when a router's state changes. By comparing established adjacencies to link states, failed routers can be detected quickly, and the network's topology can be altered appropriately. From the topological database generated from LSAs, each router calculates a shortest-path tree (SPT), with itself as root. The SPT, in turn, yields a routing table.

To achieve inter-area routing in normal OSPF, ABRs are configured to attach to multiple areas and leak addressing information from one area to another. However, the static configuration would not work in a dynamic environment like mobile ad-hoc networks (MANET). In MANET networks, any node may attach to multiple areas and serve as the ABR at any time, and multiple routers may attach to the same areas concurrently as well. If every such router serves as the ABR, multiple copies of similar inter-area-prefix-LSAs will be flooded between these areas, incurring unnecessary overhead.

SUMMARY

An intelligent ABR election method is essential to ensure the inter-area connectivity, as well as, to scale the network. The present invention achieves both goals by maintaining at least one ABR between two adjacent areas, while keeping the concurrent ABRs to a minimum.

In one aspect, the present invention provides a method for electing an area border router from a plurality of potential area border routers by determining a full set of all areas attached to a router. Then, a determination is made as to a full set of area pairs from the determined full set of areas. Until the first router is declared to be an area border router or all areas in the determined full set of all areas have been examined, routers are identified in a first area of the determined full set of areas that are reachable through an intra-area route in the first area, and routers are identified in a second area of the determined full set of areas that are reachable through an intra-area route in the second area. For any area pair in the determined full set of area pairs, if there is a router that is unreachable through either an intra-area route in the first area or an intra-area route in the second area, then declare the first router to be an area border router, else new first and second areas are selected from the determined full set of all areas.

BRIEF DESCRIPTION OF THE DRAWINGS

FIG. 3 illustrates in flow diagram form the method of the present invention.

DETAILED DESCRIPTION

Figure 1:
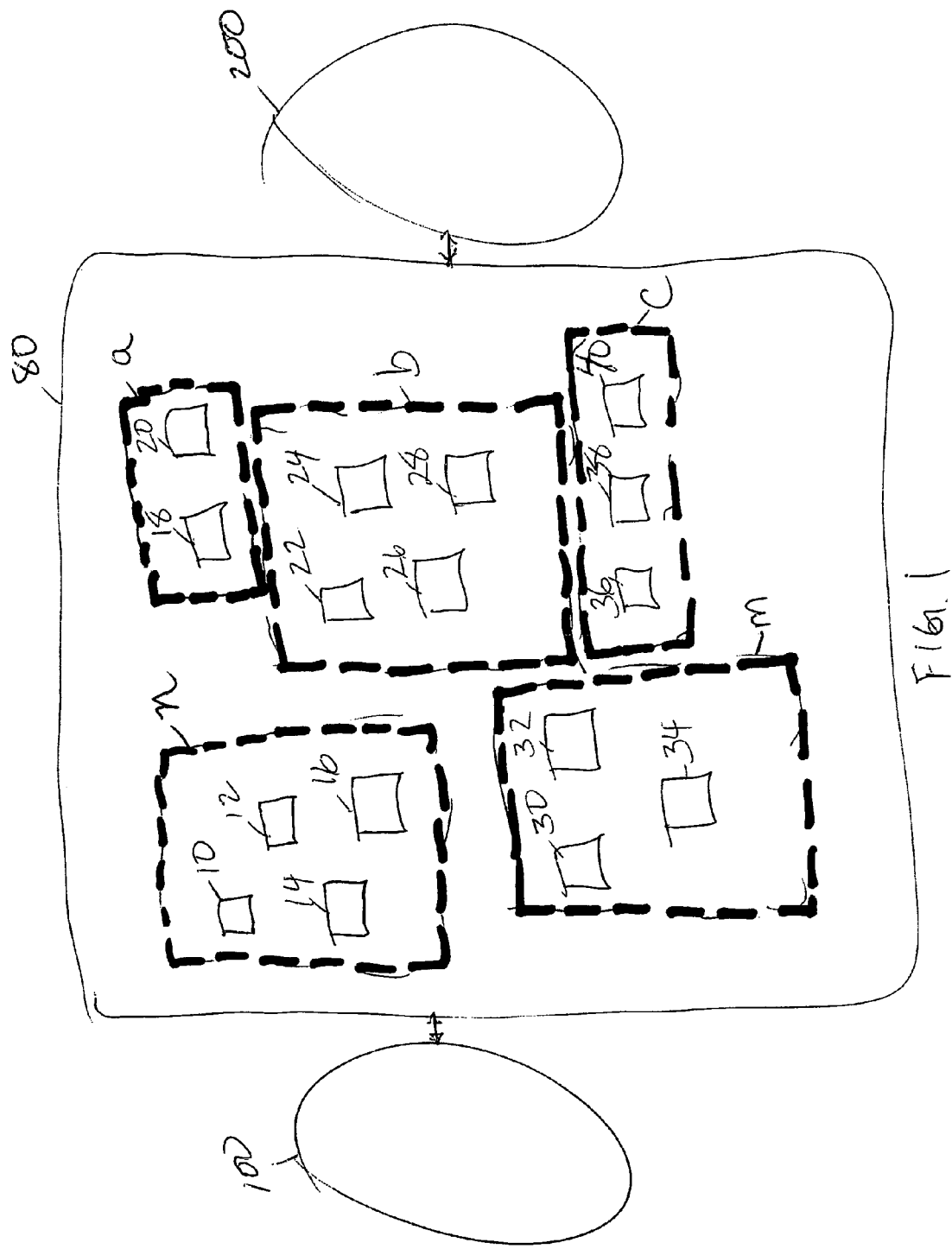
FIG. 1 illustrates a network of routers in accordance with the present invention.

Directing attention to FIG. 1, there is shown an exemplary network of routers in accordance with the present invention. Routers 10-40 function to pass traffic across network 80 in the form of packetized data between points 100, 200. Points 100, 200 can be individual, end user computer systems, local area networks, wider area networks, and may even be separate computer networks containing additional routers, but in each case data packets are sent through at least some of the routers 10-40 between points 100, 200. While FIG. 1 illustrates a network having a specific number of routers 10-40, it is to be understood that various configurations of routers can be implemented in accordance with the present invention. Such variations include the number of routers included, as well as the communication medium employed between the routers. Routers 10-40 can communicate with each other over wireless media as well as wired media, as can points 100, 200. FIG. 1 also illustrates areas of routers within network 80. Area n includes routers 10, 12, 14, and 16. Area a includes routers 18 and 20. Area b includes routers 22, 24, 26 and 28. Area m includes routers 30, 32 and 34. Area c includes routers 36, 38 and 40.

Figure 2:
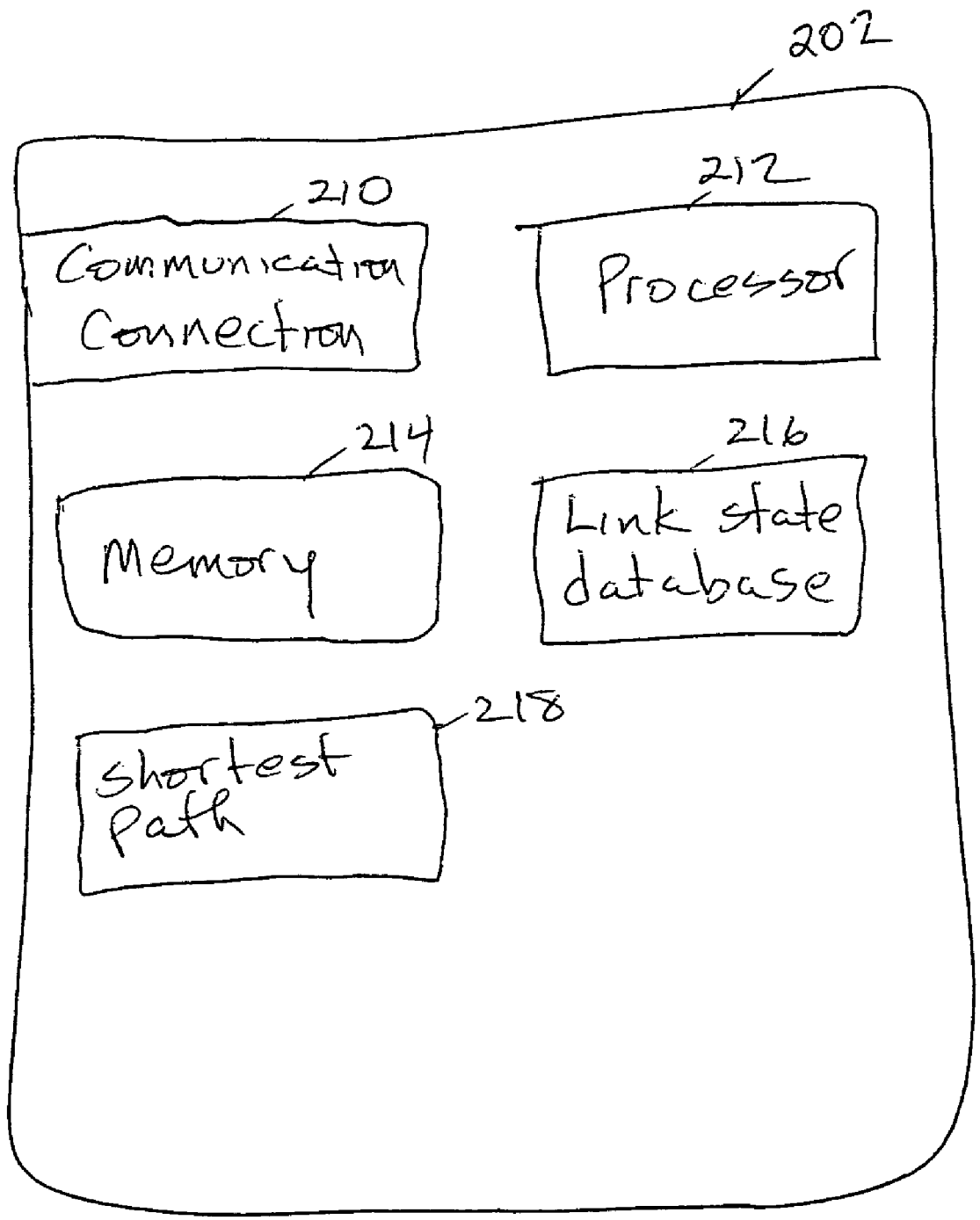
FIG. 2 illustrates in block diagram form the major components of a router in accordance with the present invention.

FIG. 2 illustrates an exemplary embodiment of routers 10-40. Router 202 includes communication connection 210, processor 212, memory 214, link state database 216, and shortest path data structure 218. Other components, commonly found in routers known to those skilled in the art, are included in router 202, but are not illustrated.

To keep the concurrent ABRs to a minimum, not all the routers attaching to multiple areas may serve as the ABRs. Instead, a MANET node may attach to multiple areas, but not leak addressing information between them. Such a node is called potential area border router (PABR). To declare itself as a PABR, the router advertises its priority to be an ABR in all its attached areas using an ABR priority TLV encapsulated in its Router-LSA. To make the ABR election consistent, such a priority should be set identically in different areas.

The organization of the router's LSA, in accordance with embodiments of the present invention, is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type          |            Length                    |
+-+-+-+-+-+-+-+-+-+-+-+-+-+-+-+-+-+-+-+-+-+-+-+-+-+-+-+-+-+-+-+-+
|  Priority    |   Reserved                                    |
+-+-+-+-+-+-+-+-+-+-+-+-+-+-+-+-+-+-+-+-+-+-+-+-+-+-+-+-+-+-+-+-+
```

Routers in MANET networks, according to location and function for the attached areas, can be classified as internal routers, potential area border routers, and area border routers. Internal routers are routers that attach to a single area. Potential area border routers are routers that attach to multiple areas, but do not leak addressing information between them. Area border routers are routers that attach to multiple areas and leak addressing information from one area to another.

In accordance with the present invention, a router decides its category when it attaches to a new area as follows. If the router attaches to the area exclusively, the router declares itself as an internal router. Otherwise, in an embodiment, if the router is an ABR in the other areas, it declares itself as ABR to the new area as well. In another embodiment, it does not declare itself as ABR to the new area. Otherwise, if the router is an internal router in the other area, it declares itself as PABR to both areas. Otherwise, the router declares itself as PABR to the new area. Only PABRs need to run the ABR election algorithm described below.

Referring to the PABR running the algorithm of the present invention as router x, the following terminology is used: A is the full set of all the areas attached to the router x. P is the full set of area pairs attached to the router x, i.e., if A={a, b, c}, then P={(a, b), (b, c), (a, c)}. Q(m) is the set of qualified routers attaching to the area m. For router x, another router (referred to herein as router y) is considered qualified in area m when router y is reachable through intra-area routes within area m; and, router y declares itself as ABR, or router y declares a higher priority than router x, or router y declares a same priority as router x, but has a higher router ID.

Directing attention to FIG. 3, the method of the present invention is now described. Q(m,n) is the set of qualified routers (area border routers and potential area border routers) attached to both area m and area n. It is equivalent to the intersection of Q(m) and Q(n), i.e., Q(m,n)=Q(m)^Q(n). Router x runs the algorithm by checking Q(m,n) against all the area pair (m,n) in the set P. If, for any area pair (j,k) in the set P where Q(j,k) is empty, router x stops further calculations and declares itself as ABR in all its attached areas. At act 300, router x determines a full set of all areas attached to router x. At act 302, router x determines a full set of area pairs attached to router x. At act 304, router x determines area border routers and potential area border routers that are reachable through intra-area routes in a first area of the full set of areas. At act 306, router x determines area border routers and potential area border routers that are reachable through intra-area routes in a second area of the full set of areas. At act 308, for any area pair identified in act 302, if there is less than a predetermined number (1 or more) of area border routers and/or potential area border routers that is reachable through either an intra-area route in the first area or an intra-area route in the second area, control transitions to act 310, where router x declares itself to be an area border router. However, if there are a predetermined number of area border routers and/or potential area border routers that are reachable router through an intra-area route in either the first or second area, control transitions to act 312, where a determination is made as to whether additional areas in the full set of areas attached to router x need to be examined. If there are remaining areas to be checked, new first and second areas are selected from the full set of areas (act 314), and control returns to act 304.

In an embodiment, the algorithm of the present invention is invoked by the addition of area pairs to the set P. In this case, the PABR will only check Q(j,k) for all area pair (j,k) newly added in the set P. In another embodiment, the algorithm of the present invention is invoked by the deletion of qualified routers from the set Q(m), for any area m in A. In this case, the PABR will only check Q(m,n), for all area n (n!=m) in A. Deletion of area pairs, or addition of qualified routers will not invoke a calculation.

While a method and apparatus for electing an area border router from potential area border routers have been described and illustrated in detail, numerous changes and modifications can be made to embodiments of the present invention without departing from the spirit thereof.

What is claimed is:

1. A method comprising:

in response to attachment of a first router to a new area, executing an area border router election algorithm on the first router to determine whether or not the first router should declare itself to be an ABR;

determining, by the area border router election algorithm executing on the first router, a full set of areas attached to the first router;

determining, by the area border router election algorithm executing on the first router, a full set of area pairs from the determined full set of areas; and until the first router is declared to be an area border router or all areas in the determined full set of areas have been examined:

determining, by the area border router election algorithm executing on the first router, area border routers and potential area border routers in a first area of the determined full set of areas that are reachable through an intra-area route in the first area, determining, by the area border router election algorithm executing on the first router, area border routers and potential area border routers in a second area of the determined full set of areas that are reachable through an intra-area route in the second area, and for any area pair in the determined full set of area pairs, if there are less than a predetermined number of area border routers and potential area border routers that are reachable through either an intra-area route in the first area or an intra-area route in the second area, then declaring, by the first router executing the area border router election algorithm, the first router to be an area border router, else selecting new first and second areas from the determined full set of areas.

2. The method of claim 1, wherein the attachment of the first router to the new area causes a new pair of areas to be added to the full set of areas attached to the first router.

3. A non-transitory computer-readable storage medium containing instructions, which, when executed by a processor, are operable to:

in response to attachment of a first router to a new area, initiate an area border router election algorithm to determine whether or not the first router should be declared an area border router;

determine, by the area border router election algorithm, a full set of areas attached to the first router;

determine, by the area border router election algorithm, a full set of area pairs from the determined full set of areas; and until the first router is declared to be an area border router or all areas in the determined full set of areas have been examined:

determine, by the area border router election algorithm, area border routers and potential area border routers in a first area of the determined full set of areas that are reachable through an intra-area route in the first area, determine, by the area border router election algorithm, area border routers and potential area border routers in a second area of the determined full set of areas that are reachable through an intra-area route in the second area, and for any area pair in the determined full set of area pairs, if there are less than a predetermined number of area border routers and potential area border routers that are reachable through either an intra-area route in the first area or an intra-area route in the second area, then declare the first router that is initially a potential area border router to be an area border router, else select new first and second areas from the determined full set of areas.

4. The non-transitory computer-readable medium of claim 3, wherein the attachment of the first router to the new area causes a new pair of areas to be added to the full set of areas attached to the first router.

5. A method comprising:

in response to attachment of a first router to a new area, initiate an area border router (ABR) election algorithm to determine whether or not the first router should declare itself to be an ABR;

determining, by the ABR election algorithm executing on the first router, a plurality of areas attached to the first router;

determining, by the ABR election algorithm executing on the first router, one or more area pairs from the plurality of areas, each area pair including a first area and a second area selected from the plurality of areas;

for each area pair of the one or more area pairs, determining, by the ABR election algorithm executing on the first router, whether there is a predetermined number of qualified routers that are reachable both via intra-area routes within the first area of the area pair and via intra-area routes within the second area of the area pair, wherein a particular router is considered a qualified router if the particular router has declared itself to be an ABR or has a higher priority to be an ABR than the first router; and provided there is an area pair of the one or more area pairs that does not have the predetermined number of qualified routers, declaring, by the first router executing the ABR election algorithm, that the first router is an ABR.

6. The method of claim 5 wherein attachment of the first router to the new area causes one or more new area pairs to be added to the one or more area pairs.

7. The method of claim 5 wherein the predetermined number is one or more.

8. The method of claim 5 further comprising:

determining the first router is a potential area border router (PABR); and executing the determining a plurality of areas attached to the first router, the determining one or more area pairs, and the determining whether there is a predetermined number of qualified routers, in response to the first router being determined to be a PABR.

9. The method of claim 5 further comprising:

advertising, by the first router, the first router's priority to be an ABR by including an ABR priority in a link-state advertisement (LSA).

10. The method of claim 9 wherein the ABR priority is included in a type-length-value (TLV) in the LSA.

11. The method of claim 5 wherein the plurality of areas attached to the first router form a mobile ad-hoc network (MANET).

12. An apparatus comprising:

one or more communication connections;

a memory; and a processor configured to execute an area border router (ABR) election algorithm in response to attachment of the apparatus to a new area, the ABR election algorithm to:

determine a plurality of areas attached to the apparatus, determine one or more area pairs from the plurality of areas, each area pair including a first area and a second area selected from the plurality of areas, for each area pair of the one or more area pairs, determine whether there is a predetermined number of qualified routers that are reachable both via intra-area routes within the first area of the area pair and via intra-area routes within the second area of the area pair, wherein a particular router is considered a qualified router if the particular router has declared itself to be an area border router (ABR) or has a higher priority to be an ABR than the apparatus, and provided there is an area pair of the one or more area pairs that does not have the predetermined number of qualified routers, declare that the apparatus is an ABR.

13. The apparatus of claim 12 wherein the predetermined number is one or more.

14. The apparatus of claim 12 wherein the processor is further configured to advertise the apparatus's priority to be an ABR by including an ABR priority in a link-state advertisement (LSA).

15. The apparatus of claim 14 wherein the ABR priority is included in a type-length-value (TLV) in the LSA.

16. A method comprising:
in response to attachment of a first router to a new area of an open shortest path first (OSPF) autonomous system (AS), executing an area border router (ABR) election algorithm on the first router to determine whether or not the first router should declare itself to be an ABR;
determining, by the ABR election algorithm executing on the first router, a plurality of areas of the OSPF AS that are attached to the first router;
determining, by the ABR election algorithm executing on the first router, one or more area pairs from the plurality of areas of the OSPF AS, each area pair including a first area of the OSPF AS and a second area OSPF AS selected from the plurality of areas of the OSPF AS;
for each area pair of the one or more area pairs, determining, by the ABR election algorithm executing on the first router, whether there is a predetermined number of qualified routers that are reachable both via intra-area routes within the first area of the OSPF AS of the area pair and via intra-area routes within the second area of the OSPF AS of the area pair, wherein a particular router is considered a qualified router if the particular router has declared itself to be an ABR or has a higher priority to be an ABR than the first router; and
in response to there being an area pair of the one or more area pairs that does not have the predetermined number of qualified routers, declaring, by the first router executing the ABR election algorithm, that the first router is an ABR.

17. The method of claim 16 wherein the predetermined number is one or more.

18. The method of claim 16 further comprising:
advertising the first router's priority to be an ABR by including an ABR priority in a link-state advertisement (LSA).

19. The method of claim 18 wherein the ABR priority is included in a type-length-value (TLV) in the LSA.

* * * * *